Figure 1:
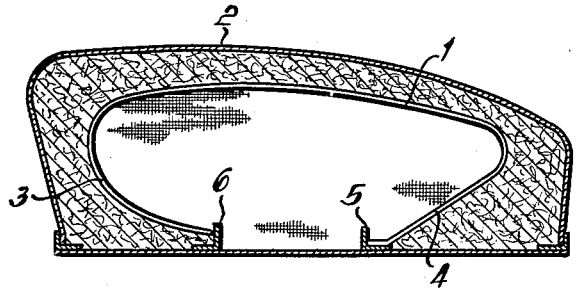

July 27, 1965  H. A. BURGERT  3,197,192
UPHOLSTERING SPRING, ESPECIALLY FOR MOTOR VEHICLE SEATS AND BACKS
Filed Dec. 21, 1961  2 Sheets-Sheet 1

INVENTOR
Herbert A. Burgert

United States Patent Office 3,197,192
Patented July 27, 1965

3,197,192
UPHOLSTERING SPRING, ESPECIALLY FOR MOTOR VEHICLE SEATS AND BACKS
Herbert A. Burgert, Porza, Switzerland, assignor, by mesne assignments, to Unitechnic AG, Chur, Switzerland
Filed Dec. 21, 1961, Ser. No. 161,145
Claims proirity, application Germany, Dec. 23, 1960, J 19,211
5 Claims. (Cl. 267—107)

The present invention relates to the upholstering of motor vehicle seats and backs therefor.

Various designs for spring cores for upholstered parts of motor vehicle seats are known. The most common upholstering spring of the type involved consists of serpentine or zigzag-shaped spring wires connected to a frame and supported a plurality of times in the central portion of the upholstering cushion. However, this type of spring is rather expensive to manufacture and also relatively complicated as to its installation.

There are also known spring cores which consist of individual springs arranged adjacent to each other. These individual springs have bent-off ends by means of which they are connected to the frame.

With all heretofore known upholstering springs of the type involved, the individual springs are supported not only at their bent-off ends but also at intermediate portions either by additional spiral springs or by supporting elements in form of leaf springs or by yokes extending transverse to the direction of the individual springs. At the connecting points of these additional supporting elements with the individual springs there are welding spots or other connections which over a longer period of time due to stresses will break. The repair of such spring cores is relatively expensive.

For the sake of completeness, it may also be mentioned that an upholstering spring system has been known which consists of one piece individual springs arranged adjacent to each other, while the supporting ends of the individual springs are bent off in a spiral manner. With this spring system, the major load is absorbed by the spiral-shaped ends which when subjected to a load wind themselves up. The stretched spring portion merely transmits the load but does not compensate or equalize the loads. Furthermore, this spring system is not safe because the individual springs have the tendency to break at the curved portions. Also the manufacture and installation of this spring type is expensive and complicated.

It is, therefore, an object of the present invention to provide an upholstering spring system for motor vehicle seats and backs therefor, which will overcome the above mentioned drawbacks.

It is another object of this invention to provide an upholstering spring system as set forth in the preceding paragraph, which will be highly economical in manufacture and installation and will yield a high safety of operation.

These and other objects and advantages of the invention will appear more clearly from the following specification in connection with the accompanying drawings, in which:

FIG. 1 diagrammatically illustrates a longitudinal section through a seat upholstered by means of a spring system according to the present invention.

Figure 2:
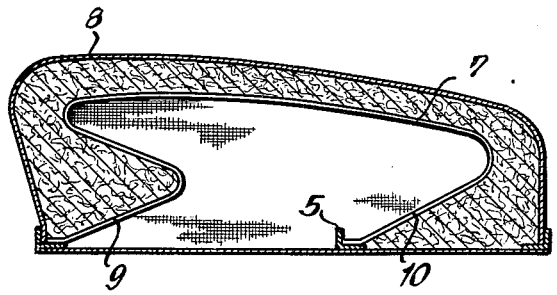

FIG. 2 is a section similar to that of FIG. 1 but with the left-hand side of the spring which corresponds to the rear of the upholstered seat, protruding in a spur-like manner in the direction toward the oppositely located spring leg.

Figure 3:
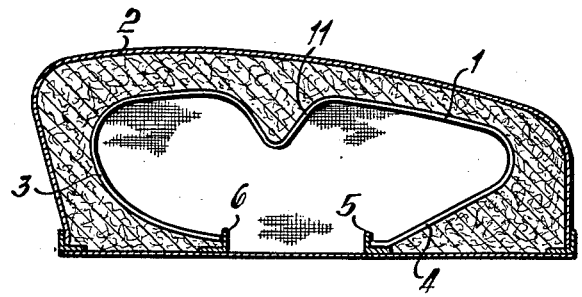

FIG. 3 differs from FIG. 1 in that the central spring portion is provided with a V-shaped protrusion pointing toward the frame of the spring structure to which the legs are connected.

Figure 4:
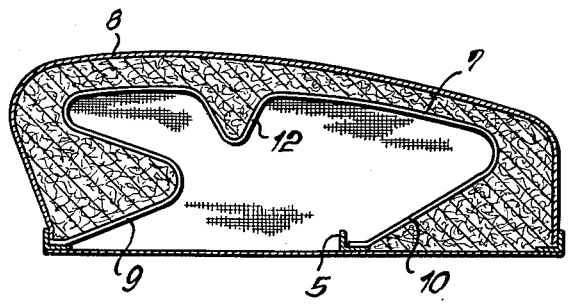

FIG. 4 differs from FIG. 2 by the same feature by which FIG. 3 differs from FIG. 1.

The upholstering spring system according to the present invention, which comprises a plurality of single piece individual springs arranged adjacent to each other and provided with bent-off ends connected to a frame, is characterized primarily in that each individual spring is self-supporting and has at least one of its ends bent exclusively inwardly. Preferably, both ends are arch-shaped and curve exclusively inwardly.

The individual springs may extend in the longitudinal direction and also in transverse direction of the seat or the back. The less loaded end of the spring may be bent Z-shaped. For purposes of increasing the elasticity, the central portion of each individual spring may be provided with a V-shaped bend extending in the direction of the spring connection. Preferably, the individual springs are made of spring band steel.

Referring now to the drawings in detail, according to FIG. 1, spring 1 is arranged in longitudinal direction of the upholstered seat 2, and the two ends 3 and 4 are bent inwardly in an arch-shaped manner. The ends of spring 1 are connected only to supports 5 and 6 of the frame so that the spring is completely self-supporting. Inasmuch as the spring is free from sharp bends, it is safe against breakage in operation. Moreover, the manufacture of the upholstering is extremely simple and inexpensive, and so is the installation, inasmuch as merely the two ends have to be connected with the supports 5 and 6.

In conformity with FIG. 2, spring 7 has the front end of the upholstering 8 which is subjected to less high loads, bent off so that the upholstering will at the said end 9 have a higher elasticity than at the end 10 which is bent off only once. The construction and installation of the upholstering of FIG. 2 otherwise corresponds to that of the upholstering 2 of FIG. 1.

FIGS. 3 and 4 show a spring which is modified over that of springs 1 and 7 inasmuch as according to FIGS. 3 and 4 the central portion of the spring is provided with a V-shaped bend 11a, 12a. This V-shaped bend likewise increases the elasticity of the spring.

The upholstering according to the invention may be equipped with identical or different springs according to FIGS. 1 to 4. In particular, it may be advantageous in the central portion of the seat to employ springs with V-shaped bends but at the lateral portions to employ springs without such V-shaped bends. The individual springs may be connected to each other by bands or other links. Advantageously, these links are likewise resilient.

It is, of course, to be understood that the present invention is, by no means, limited to the particular constructions shown in the drawings but also comprises any modifications within the scope of the appended claims.

What I claim is:
1. An upholstering spring system for a motor vehicle seat, which comprises: a frame, and a plurality of one-piece band-shaped and self-supporting individual spring elements each having a central portion with the major surface thereof shaped in conformity with the upholstering for which the spring system is intended, each of said spring elements including a first leg connected to that end of said central portion which points toward the back portion of the upholstering for which the spring system is intended and merging with said central portion along a first radius, each of said spring elements also having a second leg connected to the other end of said central portion and merging therewith along a second radius considerably greater than said first radius, the free ends of both legs pointing toward each other and being lo- cated below and in spaced relationship to said central portion and being connected to said frame, said first leg extending substantially along a straight line from its merging area with said central portion directly downwardly to said frame while forming an acute angle therewith, the said first leg having such a length that the connection of its free end with the frame is located substantially below the central area of said central portion, whereby said first leg can flex downwardly substantially into the neighborhood of said frame.

2. An upholstering spring system according to claim 1, in which the central portion of each spring element is provided with a V-shaped protrusion pointing toward said frame.

3. An upholstering spring system for a motor vehicle seat, which comprises: a frame, and a plurality of one-piece band-shaped and self supporting individual spring elements each having a central portion with the major surface thereof shaped in conformity with the upholstering for which the spring system is intended, each of said spring elements including a first leg having one end thereof merging with one end of said central portion along a first radius, each of said spring elements also having a second leg having one end merging with the other end of said central portion along a second radius considerably greater than said first radius, one of said legs extending substantially along a straight line from its merging area with said central portion directly downwardly to said frame in the direction toward the other leg while forming an acute angle with said frame, the free end of said one leg being located below and in spaced relationship to said central portion and being connected to said frame while pointing toward the other leg, the said first leg having such a length that the connection of its free end with the frame is located substantially below the central area of said central portion, whereby said first leg can flex downwardly substantially into the neighborhood of said frame.

4. An upholstering spring system for a motor vehicle seat, which comprises: a frame, and a plurality of one-piece band-shaped and self supporting individual spring elements each having a central portion with the major surface thereof shaped in conformity with the upholstering for which the spring system is intended, each of said spring elements including a first leg having one end thereof merging with one end of said central portion along a first radius, each of said spring elements also having a second leg having one end merging with the other end of said central portion along a second radius considerably greater than said first radius, one of said legs extending substantially along a straight line from its merging area with said central portion directly downwardly to said frame in the direction toward the other leg while forming an acute angle with said frame, the free end of said one leg being located below and in spaced relationship to said central portion and being connected to said frame while pointing toward the other leg, said other leg having its free end likewise connected to said frame and pointing away from said one leg, that portion of said other leg which is between its connection with said frame and its area merging with said central portion including a first section extending at an incline from said last-mentioned merging area in the direction toward said one leg while being spaced therefrom and then extending in the opposite direction at an incline to said frame, the said first leg having such a length that the connection of its free end with the frame is located substantially below the central area of said central portion, whereby said first leg can flex downwardly substantially into the neighborhood of said frame.

5. An upholstering system according to claim 4, in which said central portion is provided with a V-shaped protrusion pointing in the direction toward said frame.

References Cited by the Examiner
UNITED STATES PATENTS

| | | | |
|---|---|---|---|
| 132,350 | 10/72 | Briggs | 267—109 |
| 1,513,726 | 10/24 | Lamplugh | 267—109 X |
| 2,966,207 | 12/60 | Burgert | 267—107 |

FOREIGN PATENTS

| | | |
|---|---|---|
| 78,168 | 9/19 | Austria. |
| 445,471 | 4/36 | Great Britian. |
| 507,111 | 6/20 | France. |

ARTHUR L. LA POINT, *Primary Examiner.*